March 11, 1969   E. O. PETERSON   3,431,806
DIE-CUTTING MACHINE WITH ROTATABLE DIE-SUPPORTING PLATEN
Filed May 19, 1966   Sheet 1 of 2

Inventor
Evald O. Peterson
by [signature]
Atty

United States Patent Office 3,431,806
Patented Mar. 11, 1969

3,431,806
DIE-CUTTING MACHINE WITH ROTATABLE
DIE-SUPPORTING PLATEN
Evald O. Peterson, Lynnfield, Mass., assignor to Compo
Shoe Machinery Corporation, Waltham, Mass., a corporation of Delaware
Filed May 19, 1966, Ser. No. 551,423
U.S. Cl. 83—561                                  9 Claims
Int. Cl. B26d 5/08, 1/00, 3/00

ABSTRACT OF THE DISCLOSURE

A die-cutting machine having a work-supporting platen above which there is a beam on which is mounted a support for holding a die for movement transversely of the work-supporting platen in one direction and then the other for making a succession of cuts crosswise of the work and successive parallel rows of cuts longitudinally of the work.

---

A machine of the foregoing kind is disclosed in application Ser. No. 383,378, filed July 17, 1964, now Patent No. 3,264,915.

In that machine the cutting die is mounted to the lower end of a ram, the latter being operable by movement perpendicular to the work-supporting platen to lower and press the die into cutting engagement with the sheet material resting on the work-supporting platen. The cutting die occupies the same orientation relative to the axis of the cutting stroke in each direction of movement transversely of the platen, so that if the parts being cut are of irregular shape a great deal of material is wasted between the parts in successive rows of cuts. It is the purpose of this invention to reduce the waste by interfitting the cuts in successive rows of cuts. This is achieved herein by mounting fixed and rotary pressure-transmitting platens at the lower end of the ram for rotation of the rotatable platen relative to the fixed platen about an axis perpendicular to the work-supporting platen and mounting the cutting die on the rotary platen so that it can be rotated with the rotary platen angularly about the axis of the cutting stroke relative to the work-supporting platen to any desired angular position. The rotary platen is supported by a spindle which, in turn, is secured to the lower end of the ram, and a gear is fixed to the spindle for effecting rotation thereof and hence of the rotary platen. The fixed and rotary platens containing confronting recesses through which the spindle extends and the gear is mounted in the composite recess on the spindle. A lateral opening affords access to the composite recess and a lever is pivotally mounted between the platens which has on it a sector in mesh with the gear. The distal end of the lever extends from the composite recess and affords means for effecting rotation of the gear and hence the rotary platen. A fluid operable motor provides for effecting rotation of the lever and to this end a piston rod extends from one end of the motor and is connected by a link to the distal end of the lever. The stroke of the piston rod and hence the movement of the lever is controlled by an adjustable part mounted in alignment with the rod.

The invention will now be described in greater detail with reference to the accompanying drawings wherein.

Figure 1:
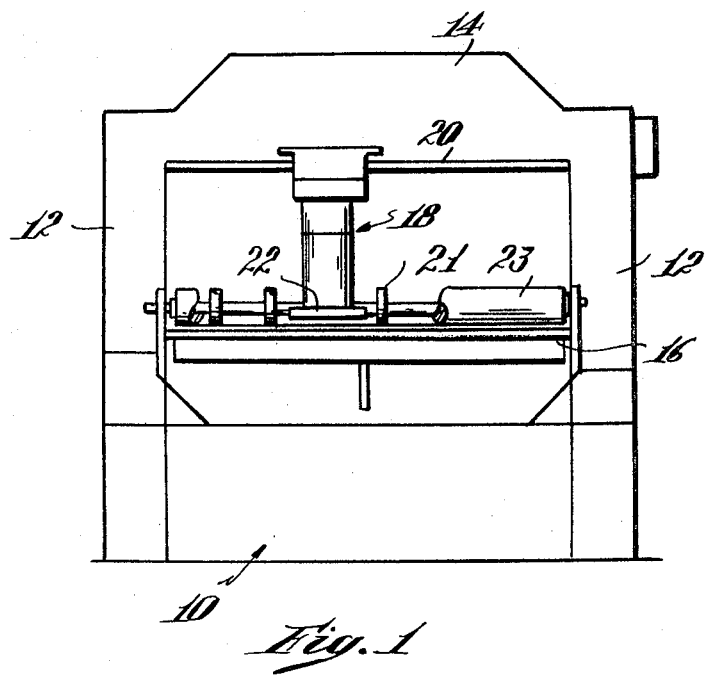
FIG. 1 is an elevation of a die-cutting machine embodying the invention.

Referring to the drawings, the press comprises a frame having a base 10, spaced parallel, vertical posts 12 rising from the base, a horizontal beam 14 at the upper ends of the posts 12 parallel to the base, a fixed horizontal work-supporting platen 16 mounted between the posts below the beam 14, and a fluid operable ram 18 supported on tracks 20 at the underside of the beam for movement across and back relative to the work-supporting platen 16. The ram has at its lower end a flange plate 22 to which a cutting die may be attached for movement of the latter toward or from the work-supporting platen. Work feeding rolls 21 and 23 at the rear and forward sides of the work-supporting platen 16 provide for advancing sheet material across the platen.

Figure 2:
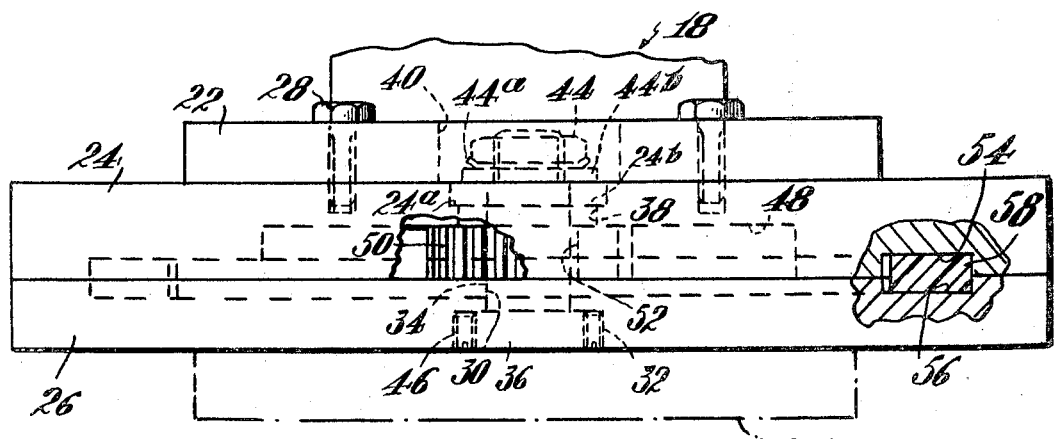
FIG. 2 is an elevation, partly in section, of fixed and rotatable pressure-transmitting platens secured to the lower end of a ram by means of which they are lowered to press a cutting die secured to the rotatable platen into engagement with a workpiece resting on the work-supporting platen.

In accordance with this invention a fixed (non-rotatable) platen 24 and a rotatable platen 26 are mounted on the flange plate 22 (FIG. 2). The fixed platen 24 is attached to the flange plate 22 by means of bolts 28 extending through the flange plate into the platen 24. The rotatable platen 26 contains a centrally located hole 30 having a large countersunk opening 32 in its lower end for receiving a spindle 34 having a head 36. The spindle extends upwardly from the rotatable platen 26 through a centrally located hole 38 in the fixed platen 24 into a centrally located hole 40 in the flange plate 22, and is suspended at its upper end from the flange plate 22 by a nut 44 threaded onto its upper end, the latter being held in place by a lock washer 44a. To provide suitable bearing the upper side of the fixed platen 24 is recessed to provide a shoulder 24a, a bearing ring 24b is mounted in the recess on the shoulder, and a washer 44b is interposed between the lock washer 44a and the bearing ring 24b.

The rotatable platen 26 rests on the head 36 and is non-rotatably secured to the spindle by one or more locking screws 46 screwed into the rotatable platen 26 and the head 36 at one or more places where the interior surface of the opening 32 and the exterior surface of the head 36 confront each other. The lower side of the fixed platen 24 contains a circular opening 48 of relatively large diameter which is concentric with the axis of the spindle 34 and within the opening a gear 50 is mounted on the spindle 34 and fastened thereto by a key 52. The gear is provided for effecting rotation of the spindle and hence of the rotatable platen 26 as will appear hereinafter.

To provide for accuracy and minimum frictional resistance to rotation of the rotatable platen 26 relative to the fixed platen 24, the confronting faces of the fixed and movable platens are provided with circular grooves 54 and 56, and in the composite groove formed by the grooves 54 and 56 there is mounted a stabilizer ring 58 which permits cocking during indexing.

Figure 4:
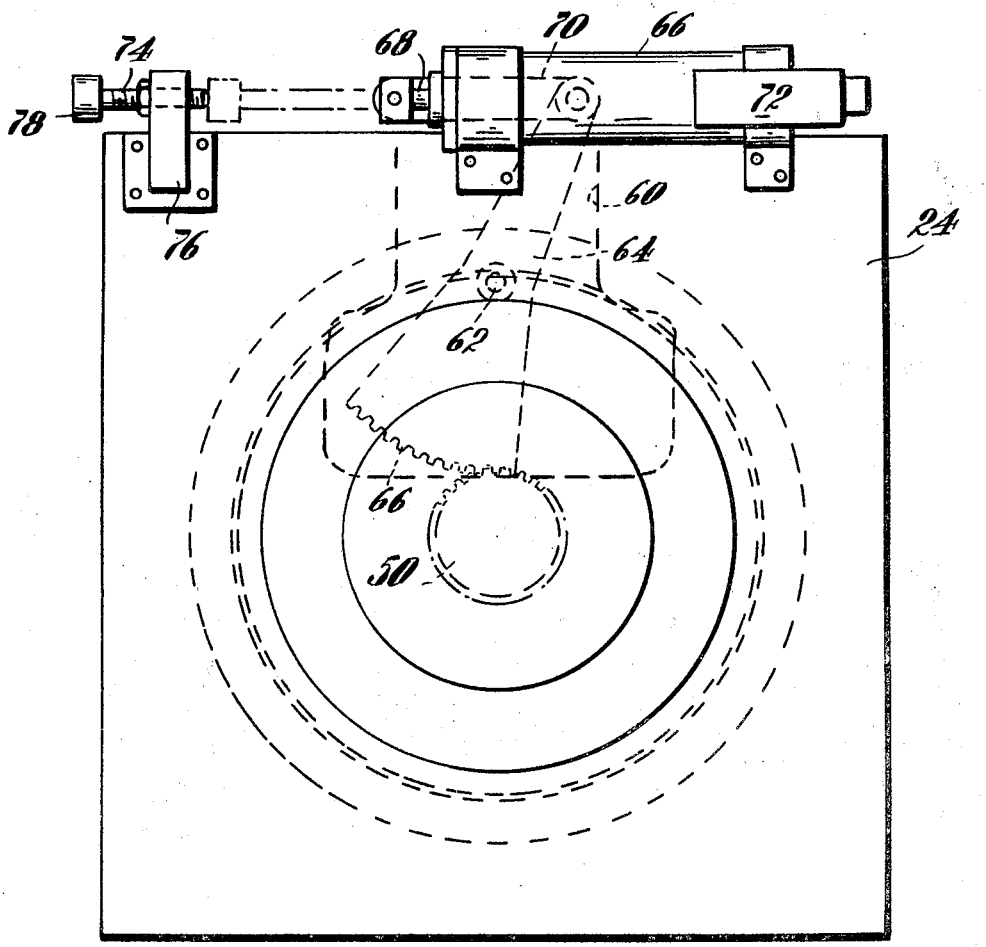
FIG. 4 is a plan view of FIG. 2.

The opening 48 in the fixed platen 24, as can be seen by reference to FIG. 4, has an extension 60 at one side affording access thereto in which there is pivotally mounted, on a pivot 62, a lever 64, the inner end of which is arcuate and is provided with teeth so that it constitutes a gear segment 66 which meshes with the gear 50. The distal end of the lever 64 extends from the opening 60 and is operable by movement to effect rotation of the gear segment about the pivot 62 and through the gear 50 to effect rotation of the rotatable platen.

Movement of the lever 64 is effected by a fluid operable motor 66 mounted on the fixed platen 24 adjacent the distal end of the lever 64 and parallel to one edge of the platen. The motor contains a piston (not shown) and a piston rod 68 which extends from the motor cylinder. A link 70 pivotally connects the distal end of the lever 64 to the rod 68 so that linear movement of the rod is transmitted to the lever 64 without binding even though the latter moves along an arcuate path. A valve 72 provides for supplying fluid pressure to the opopsite ends of the motor cylinder to effect movement of the lever in one direction or the other. An adjsutable bolt 74 is mounted in a bracket 76 on the fixed platen in alignment with the distal end of the rod 68 and is adjustable axially by means of a knurled head 78 to limit the stroke of the rod 68 and hence the angular movement of the lever and the rotatable platen. For practical purposes angular rotation of the rotatable platen through 180° is all that is required.

The rotatable platen provides support for a cutting die and provides for rotation of the cutting die about a vertical axis perpendicular to the work-supporting platen. The cutting die, which may be of conventional construction, is shown in dot and dash lines as attached to the lower side of the rotatable platen.

Figure 3:
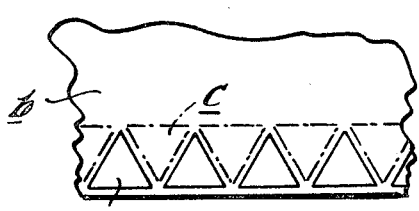
FIG. 3 is a fragmentary plan view of two successive rows of cuts made transversely of a workpiece showing the interposition of the pieces by reversing the position of the cutting die as it travels from one side of the work-supporting platen to the other and back.

By way of example, if the cutting die was shaped to cut a series of triangular pieces *a* across a workpiece *b* resting on the work-supporting platen 16 with, as shown in FIG. 3, the bases of the triangular pieces in line, it is obvious that when the workpiece *b* is advanced a distance corresponding to a perpendicular to the base of the triangle for cutting a row of pieces *c* in the opposite direction, all of the material between adjacent triangles would be wasted.

By means of the rotatable platen employed herein, when the die has been moved transversely from the left side to the right side to cut a row of triangular parts *a*, the rotatable platen can be rotated through 180° and then moved in the opposite direction, that is from right to left, to cut a second row of parts *c* from the material between the cuts made during the previous operation without having to advance the workpiece on the platen, so that pieces may be cut from the workpiece in the succeeding row intermediate the pieces cut in the workpiece in the preceding operation. The triangular configuration of the pieces shown herein is solely for illustration since it is evident that the cutting dies may be of any desired configuration and that the rotation afforded by the rotatable platen makes it possible to interfit the cuts in successive rows to obtain a maximum economy of the material from which the pieces are being cut.

The machine is provided with power operation and a control circuit including switches at opposite sides for advancing the work the desired amount or not at all at the end of each row of cuts and reversing the direction of travel of the cutting die. As also described in the aforesaid machine, the control circuit may be set for half-stepping of the cutting die transversely of the platen so that the cuts in successive rows will be offset with respect to each other, that is the cuts in one row will fall between those in the preceding row.

It should be understood that the present disclosure is for the purpose of illustration only and that this invention includes all modifications and equivalents which fall within the scope of the appended claims.

I claim:
1. In a press, a work-supporting platen, a pressure-transmitting platen supported in spaced parallel confronting relation to the work-supporting platen, means for effecting movement of the pressure-transmitting platen toward and away from the work-supporting platen, and means for mounting a cutting die on the pressure-transmitting platen for rotation thereon about an axis perpendicular to the work-supporting platen to change the angular position of the cutting die on the pressure-transmitting platen relative to the work-supporting platen, said means comprising a spindle rotatably supported on the pressure-transmitting platen, a rotary platen supported parallel to the pressure-transmitting platen by said spindle, a gear fixed to the spindle, and a gear sector pivotally supported in engagement with said gear, said gear sector being operable by rotation to rotate the spindle and hence the rotary platen.

2. A press according to claim 1, wherein the means mounting the cutting die on the pressure-transmitting platen is a rotatable platen rotatably connected to the pressure-transmitting platen for rotation in a plane parallel to said pressure-transmitting platen.

3. A press according to claim 1, comprising a spindle supported at its uper end from the upper side of the pressure-transmitting platen by a nut threaded on the upper end of the spindle, said spindle having a head at its lower end, a rotatable platen supported by the head at the lower end of the spindle parallel to the lower side of the pressure-transmitting platen, said rotatable platen being non-rotatably fixed to the spindle so as to be rotatable with the spindle, and means on the spindle for effecting rotation thereof and hence the rotatable platen angularly about an axis perpendicular thereto.

4. A press according to claim 1, wherein the pressure-transmitting platen contains a recess concentric with the axis of the spindle, and an opening affording access to the recess, a gear fixed to the spindle within the recess, a lever pivotally mounted between the platens in said recess, said lever having a gear sector at its inner end in mesh with the gear, and an arm projecting from the recess by means of which the sector may be rotated to effect rotation of the rotatable platen.

5. A press according to claim 1, comprising a rotatable platen mounted against the underside of the pressure-transmitting platen for rotation about an axis perpendicular to the work-suporting platen, said pressure-transmitting platen containing a recess in the face confronting the rotatable platen, a spindle extending from the rotatable platen into the recess, a gear fixed to the spindle, and means meshing with the gear, said means embodying a pivotally supported lever projecting laterally from the recess, said lever being operable by pivotal movement to effect rotation of the gear and hence the rotatable platen.

6. A press according to claim 1, wherein the pressure-transmitting and rotatable platens have confronting circular grooves concentric with the axis of the spindle, and a stabilizer ring is mounted therein.

7. A press according to claim 4, comprising power-operable means to which the distal end of the lever is connected operable to effect pivotal movement of the lever and hence angular rotation of the rotatable platen.

8. A press according to claim 4, comprising a fluid pressure operable motor embodying a projecting rod reciprocable by applying fluid pressure to the motor, means pivotally connecting the distal end of the lever to the distal end of the rod, and means for adjustably limiting the stroke of the rod.

9. A press according to claim 4, comprising a fluid pressure operable motor mounted on the pressure-transmitting platen, said motor embodying a piston and a rod extending therefrom, a valve on the motor operable to control the direction of flow of pressure fluid to the motor to effect reciprocation of the rod, a link pivotally connecting the distal end of the lever to the distal end of the rod, a screw-threaded part mounted on the pressure-transmitting platen in alignment with the distal end of the rod, said screw-threaded part being adjustable relative to the motor to control the length of the stroke of the rod.

References Cited

UNITED STATES PATENTS

| | | | |
|---|---|---|---|
| Re. 2,321 | 7/1866 | Hatch et al. | 83—561 X |
| 2,268,856 | 1/1942 | Cummings | 83—34 |
| 3,252,365 | 5/1966 | Hardy | 83—34 |
| 3,370,492 | 2/1968 | Treff | 83—34 X |
| 120,642 | 11/1871 | Hawkins | 83—562 X |
| 740,763 | 6/1903 | Koehler | 83—699 X |
| 812,283 | 2/1906 | McBride | 83—562 |
| 1,938,678 | 12/1933 | Altvater | 83—561 X |
| 2,709,492 | 5/1955 | Thomann et al. | 83—267 X |

ANDREW R. JUHASZ, *Primary Examiner.*

FRANK T. YOST, *Assistant Examiner.*

U.S. Cl. X.R.

83—34, 536, 699